(12) United States Patent
Surnilla

(10) Patent No.: US 7,946,259 B2
(45) Date of Patent: May 24, 2011

(54) MULTI-STROKE INTERNAL COMBUSTION ENGINE

(75) Inventor: Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 463 days.

(21) Appl. No.: 12/208,194

(22) Filed: Sep. 10, 2008

(65) Prior Publication Data

US 2010/0059015 A1 Mar. 11, 2010

(51) Int. Cl.
*F02B 69/06* (2006.01)
*F01L 1/34* (2006.01)

(52) U.S. Cl. .................. 123/21; 123/432; 123/90.17

(58) Field of Classification Search ............. 123/21, 123/90.15–90.17, 432
See application file for complete search history.

(56) References Cited

U.S. PATENT DOCUMENTS

| | | | | |
|---|---|---|---|---|
| 5,007,382 A | * | 4/1991 | Kawamura | 123/21 |
| 5,022,353 A | * | 6/1991 | Kamamura | 123/21 |
| 5,158,044 A | * | 10/1992 | Kawamura | 123/21 |
| 5,517,951 A | * | 5/1996 | Paul et al. | 123/21 |
| 5,699,758 A | * | 12/1997 | Clarke | 123/21 |
| 6,257,176 B1 | | 7/2001 | Shimasaki et al. | |
| 6,446,588 B2 | * | 9/2002 | Yamada et al. | 123/90.11 |
| 6,499,452 B2 | | 12/2002 | Ma | |
| 6,523,504 B2 | * | 2/2003 | Miura | 123/21 |
| 6,866,012 B2 | * | 3/2005 | Hayase et al. | 123/90.11 |
| 7,036,465 B2 | | 5/2006 | Burk et al. | |
| 7,565,896 B1 | * | 7/2009 | Yang | 123/321 |
| 7,591,244 B2 | * | 9/2009 | Auffret et al. | 123/321 |
| 2010/0063706 A1 | | 3/2010 | Surnilla | |

FOREIGN PATENT DOCUMENTS

| | | |
|---|---|---|
| JP | 0222632 | 2/1990 |
| JP | 3064604 | 3/1991 |

* cited by examiner

*Primary Examiner* — Thomas N Moulis
(74) *Attorney, Agent, or Firm* — Allan J. Lippa; Alleman Hall McCoy Russell & Tuttle LLP

(57) ABSTRACT

An engine system and method of its operation are described. The method includes: operating the combustion chamber in a four stroke cycle by repeatedly opening a first exhaust valve of the combustion chamber once every four piston strokes while holding closed a second exhaust valve of the combustion chamber; after operating the combustion chamber in the four stroke cycle, operating the combustion chamber in a two stroke cycle by repeatedly opening the first exhaust valve once every four piston strokes and repeatedly opening the second exhaust valve once every four piston strokes during a different exhaust stroke than the first exhaust valve; and after operating the combustion chamber in the two stroke cycle, operating the combustion chamber in the four stroke cycle by repeatedly opening the second exhaust valve of the combustion chamber once every four piston strokes while holding closed the first exhaust valve of the combustion chamber.

20 Claims, 5 Drawing Sheets

MULTI-STROKE INTERNAL COMBUSTION ENGINE

BACKGROUND AND SUMMARY

Some engines operate according to a four stroke cycle comprising an intake stroke, a compression stroke, a power stroke, and an exhaust stroke. Other engines operate according to a two stroke cycle where the intake stroke is partially shared with the compression stroke and the exhaust stroke is partially shared with the power stroke. Some engines have been developed that can be selectively operated in a two stroke cycle during some conditions and a four stroke cycle during other conditions. In this way, the engine may exhibit higher power output through selective use of the two stroke cycle while achieving increased fuel efficiency through selective use of the four stroke cycle.

The inventor herein has recognized that some valves of the engine may undergo greater wear than other valves as the result of their more frequent use, particularly when transitions are performed between four stroke operation and two stroke operation. As such, asymmetric valve system wear may occur as a result of these transitions. To reduce asymmetric valve system wear, the inventor has provided a method that includes: operating the combustion chamber in a four stroke cycle by repeatedly opening a first exhaust valve of the combustion chamber once every four piston strokes via a first cam actuator while holding closed a second exhaust valve of the combustion chamber; after operating the combustion chamber in the four stroke cycle, operating the combustion chamber in a two stroke cycle by repeatedly opening the first exhaust valve once every four piston strokes via the first cam actuator and repeatedly opening the second exhaust valve once every four piston strokes via a second cam actuator during a different exhaust stroke than the first exhaust valve; and after operating the combustion chamber in the two stroke cycle, operating the combustion chamber in the four stroke cycle by repeatedly opening the second exhaust valve of the combustion chamber once every four piston strokes via the second cam actuator while holding closed the first exhaust valve of the combustion chamber. Note that this approach may be similarly applied to the intake valves in some examples.

In this way, the valves that were previously operated during the four stroke cycle may be periodically switched with the valves that were previously deactivated during the four stroke cycle, thereby enabling the valves to be operated on a more even basis while reducing asymmetric valve system wear. As such, the operating life cycle of the valve system may be increased.

DETAILED DESCRIPTION

Figure 1:
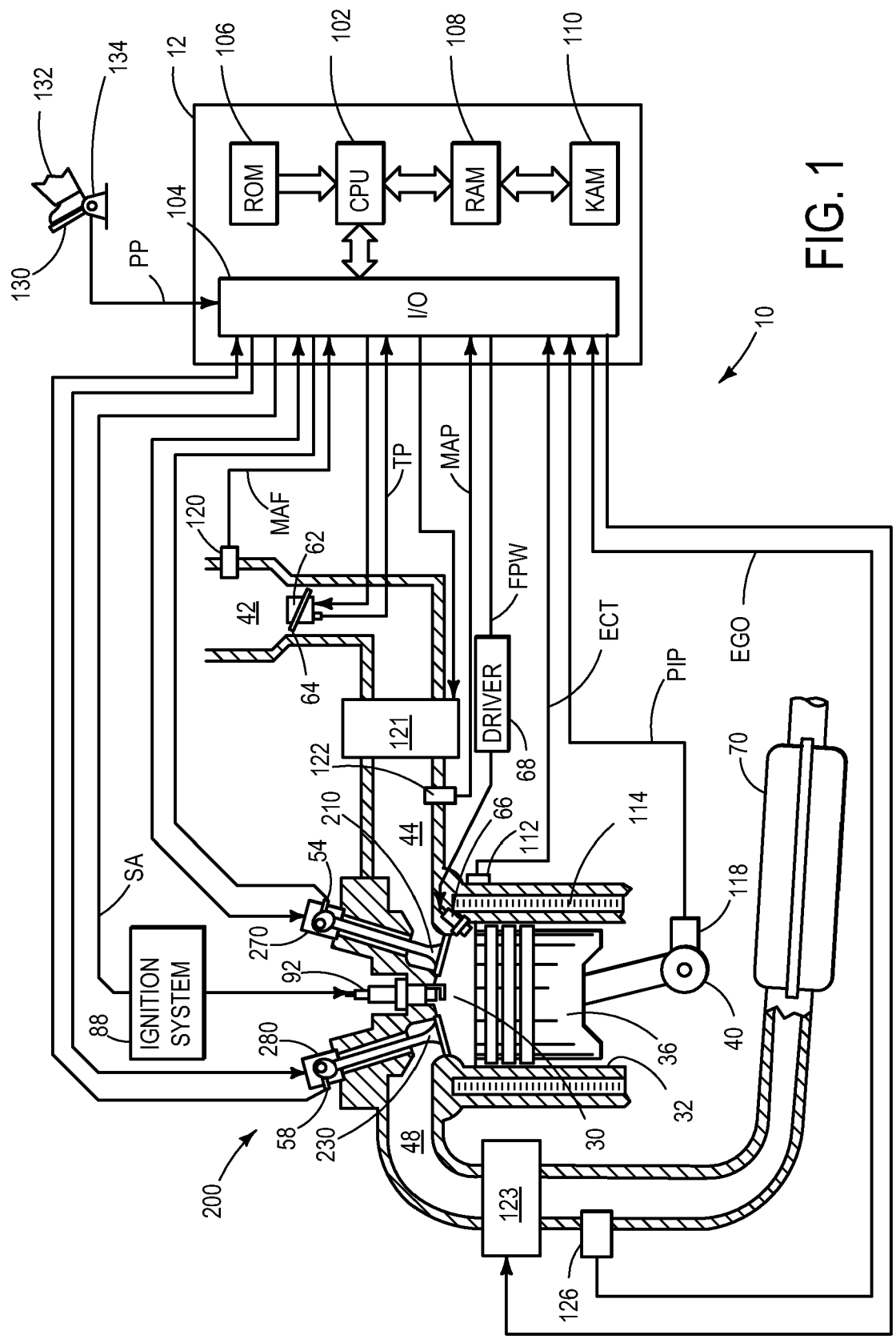
FIG. 1 illustrates an example internal combustion engine system.

FIG. 1 illustrates an example internal combustion engine system 10. Engine system 10 includes an engine body 32 defining one or more combustion chambers (i.e. cylinders), an example of which is illustrated at 30. Each combustion chamber may include a respective piston 36 disposed therein. Engine system 10 further includes an intake manifold 44 coupled to the engine body, which defines a first fluid passage that communicates with combustion chamber 30 (among other combustion chambers of the engine) via a first intake valve 210 and a second intake valve 220 (shown in FIG. 2). Engine system 10 further includes an exhaust manifold 48 coupled to the engine body, which defines a second fluid passage that communicates with combustion chamber 30 (among other combustion chambers of the engine) via a first exhaust valve 230 and a second exhaust valve 240 (shown in FIG. 2). The combustion chamber may receive intake air via the first fluid passage and may exhaust products of combustion (i.e. exhaust gases) via the second fluid passage provided by intake manifold 44 and exhaust manifold 48, respectively.

Intake manifold 44 may receive intake air from an intake passage 42, which may include one or more of a throttle 62 and a compressor 121. Compressor 121 forms a compressor stage of a boosting device, which may include a supercharger or a turbocharger that further includes an exhaust gas turbine 123 arranged along the exhaust passage downstream of the exhaust valves. Throttle 62 may include a throttle plate 64, the position of which may be electronically controlled. Intake passage 42 may also include a mass airflow sensor 120 and intake manifold 44 may include a manifold pressure sensor 122 that can provide an indication of boost pressure downstream of compressor 121.

Combustion chamber 30 may include a fuel injector 66, which is configured to inject fuel directly into the combustion chamber in this particular example. However, in other examples, fuel injector 66 may be arranged upstream of intake valve 210, such as along intake manifold 44 or intake passage 42. A fuel injector driver 68 may be provided to control the fuel injection according to a prescribed timing, which may depend on whether the engine is operating in a two stroke cycle or a four stroke cycle. Combustion chamber 30 may optionally include a spark plug 92 for igniting an air and fuel mixture within the combustion chamber. An ignition system 88 may initiate ignition within the combustion chambers of the engine via the spark plugs according to a prescribed timing, which may depend on whether the engine is operating in a two stroke cycle or a four stroke cycle. In other embodiments, spark plug 92 may be omitted, such as with compression ignition engines or diesel engines. Specifically, in one example, engine 10 may operated with homogeneous charge compression ignition (in one or both of two-stroke and/or four-stroke operation. Alternatively, compression ignition diesel combustion may be used. Further still, a first combustion mode may be used with a first number of strokes (e.g., gasoline HCCI in two stroke) and a second, different combustion mode may be used with a second number of strokes (e.g., gasoline spark ignition in four stroke mode).

Engine body 32 may include coolant passages 114 that at least partially surround the combustion chamber. A coolant temperature sensor 112 can provide an indication of engine coolant temperature. Piston 36 may be operatively coupled with a crankshaft 40 via a crank arm. Crankshaft 40 may be similarly coupled to other pistons of the engine. An engine speed and position sensor 118 may be provided at crankshaft 40. As one example, sensor 118 may comprise a hall effect sensor.

An exhaust gas composition sensor 126 may be provided along an exhaust passage that is fluidly coupled with exhaust manifold 48. Sensor 126 may provided an indication of oxygen concentration in the exhaust gas produced by the engine, thereby providing an indication of air/fuel ratio combusted at the engine. An exhaust aftertreatment device 70 may be provided along the exhaust passage for processing products of combustion.

Engine system 10 may include an electronic controller 12. Electronic controller 12 in combination with ignition system 88 and driver 68, among other suitable control components may comprise a control system of the engine. Controller 12 may include a processing subsystem (CPU) 102, which may comprise one or more processors. Controller 12 may include memory that comprises instructions that may be executed by the processing subsystem. This memory may include read only memory (ROM) 106, random access memory (RAM) 108, and keep alive memory (KAM) 110. Processing subsystem 102 may communicate with the various sensor and actuators described herein via an input/output (I/O) interface 104. For example, controller 12 may receive sensory feedback from in the form of mass air flow (MAF) via sensor 120, intake manifold pressure (MAP) via sensor 122, throttle position (TP) from throttle 62, engine coolant temperature (ECT) via sensor 112, exhaust composition (EGO) such as exhaust gas oxygen content via sensor 126, and engine position (PIP) via sensor 118 which may be used to calculate engine speed. Additionally, controller 12 may receive an indication of operator requested engine output (e.g. torque and/or speed) from a user input device 130 via a sensor 134. As one example, user input device 130 may include an accelerator pedal that may be depressed by a vehicle operator 132. Sensor 134 may comprise a pedal position sensor, for example. Further, controller 12 may control one or more of the following: the position of throttle plate 64 via throttle 62, a state of compressor 121 to vary boost pressure, a state of turbine 123 to vary boost pressure, spark timing via ignition system 88 through spark advance signal (SA), fuel injection timing and amount via driver 68 through fuel pulse-width (FPW) signal, and valve timing via valve system 200.

Figure 2:
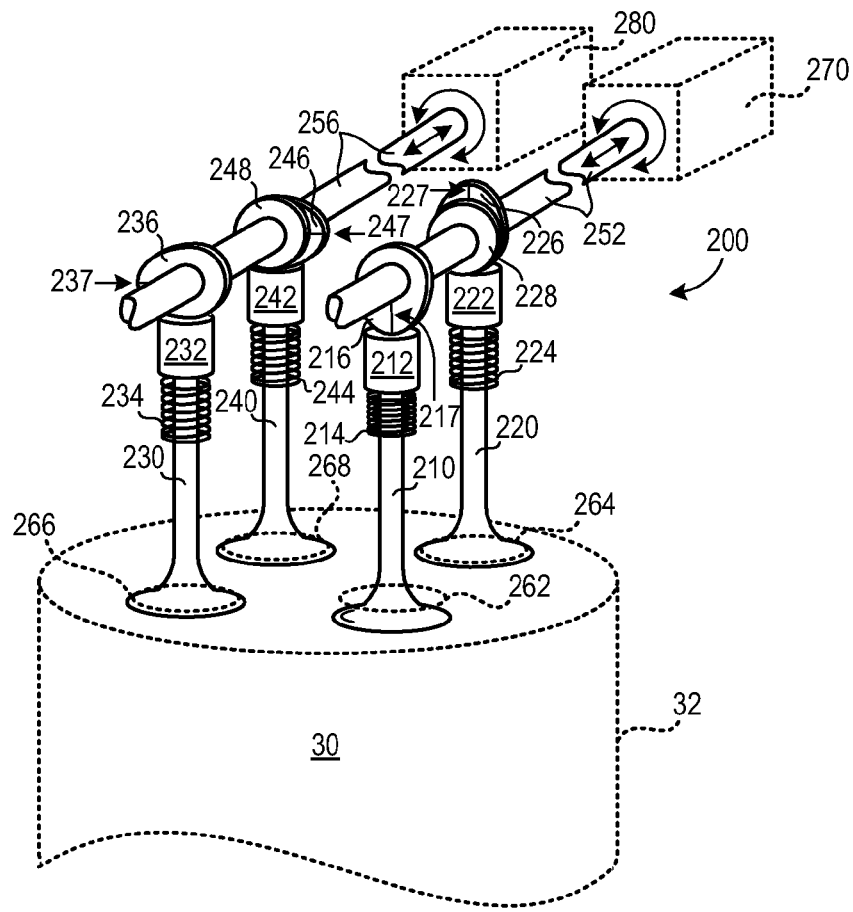
FIG. 2 illustrates an example valve system.

Engine system 10 may include a valve system 200 shown in greater detail in FIG. 2. The valve system may include a plurality of cam actuators for controlling the position of the various intake and exhaust valves. Controller can obtain valve timing and/or cam actuator state information for the intake and exhaust valves from sensors 54 and 58. In some embodiments, the engine system may include a first cam actuator and a second cam actuator configured to open the first intake valve and the second intake valve, respectively. In some embodiments, first cam actuator and second cam actuator may be arranged on a common cam shaft. In other embodiments, first cam actuator and second cam actuator may be arranged on different cam shafts.

In some embodiments, the engine system may further include a third cam actuator and a fourth cam actuator configured to open the first exhaust valve and the second exhaust valve, respectively. In some embodiments, third cam actuator and fourth cam actuator may be arranged on a common cam shaft. In other embodiments, third cam actuator and fourth cam actuator may be arranged on different cam shafts. In some embodiments, the first, second, third, and fourth cam actuators may be arranged on a common cam shaft. While in other embodiments, the first and third cam actuators may be arranged on a first cam shaft, and the second and fourth cam actuators may be arranged on a second cam shaft. As such, various embodiments of the valve system are possible.

Regardless of the particular cam actuator configuration relative to the above described cam shafts, these cam shafts may be mechanically coupled to a crankshaft of the engine so that the cam shaft rotates in relation to the rotation of the crankshaft by a prescribed speed ratio. As one example, where the various cam actuators each include a single cam lobe, the cam shafts may be mechanically coupled to the crank shaft in a manner that causes the cam shaft to rotate at half the speed of the crank shaft. In other words, the cam shafts may be configured to rotate only one revolution for every two revolutions of the crank shaft. In this way, the cam lobe of each cam actuator may engage its respective valve once per every four strokes of the piston to cause the valve to open.

In other embodiments where the cam actuators each include two or more cam lobes, the cam shafts may be configured to rotate at different speeds relative to the crank shaft. For example, where the cam actuators each include two cam lobes, the cam shafts may be configured to rotate at one quarter the speed of the crank shaft. In other words, the cam shafts may be configured to rotate only one revolution for every four revolutions of the crank shaft. In this way, one of the two cam lobes of each cam actuator may be engage its respective valve once per every four strokes of the piston to cause the valve to open.

FIG. 2 illustrates a non-limiting example of valve system 200. In this example, combustion chamber 30 which was previously described with reference to FIG. 1, is depicted with engine body 32 defining intake ports 262 and 264, and exhaust ports 266 and 268. While the combustion chamber is depicted with two intake ports and two exhaust ports, it should be appreciated that combustion chamber 30 may include another suitable number of intake and exhaust ports. Note that in the embodiment of FIG. 2, the intake and exhaust valves are configured as poppet valves that are arranged in the intake and exhaust ports located at or near the top of the combustion chamber.

Each of the intake and exhaust ports include an associated valve that may be moved (e.g. translated) relative to the port to open and close communication with the combustion chamber and the intake or exhaust manifold. For example, intake air may be admitted to combustion chamber 30 via one or more of intake ports 262 and 264 when their respective intake valves 210 and 220 are opened. Intake valve 210 is depicted in FIG. 2 in an open position that enable intake air to flow into the combustion chamber from the intake manifold, while intake valve 220 is depicted in a closed position, thereby inhibiting intake air from flowing into the combustion chamber via intake port 264. Similarly, exhaust gases may be exhausted from combustion chamber 30 via one or more of exhaust ports 266 and 268 when their respective exhaust valves 230 and 240 are opened.

In this particular embodiment, intake valves 210 and 220 are actuated by cam actuators mounted on a common cam shaft 252 and exhaust valves 230 and 240 are actuated by cam actuators mounted on a common cam shaft 256. In other embodiments, the intake and/or exhaust valves may be actuated by cam actuators that are mounted on separate cam shafts. Cam shafts 252 and 256 may be driven to rotate at a rotational speed that is proportional to the rotational speed of the crank shaft of the engine (i.e. engine speed). In some embodiments, crank shafts 252 and 256 may be operatively coupled to the crankshaft via a 2:1 gear ratio, which causes the cam shafts to rotate at one half the rotational speed of the crank shaft. Thus, the cam shafts may be driven to rotate through 360 cam angle degrees for every 720 crank angle degrees. It should be appreciated that other suitable gear ratios may be used.

It should be appreciated that cam shafts 252 and 256 may include cam actuators for opening valves associated with other combustion chambers of the engine. As such, intake cams actuators associated with other combustion chambers of the engine may be mounted on cam shaft 252 and exhaust cams actuators associated with other combustion chambers of the engine may be mounted on cam shaft 256.

Intake valve 210 may include a tappet 212 and a valve spring 214. Valve spring 214 may be configured to urge intake valve 210 to a closed position with respect to intake port 262 until opened by an actuation received from a cam actuator (e.g. cam actuator 216) via tappet 212. For example, in FIG. 2, cam actuator 216 which includes a cam lobe 217 is depicted actuating valve 262 via tappet 212 to cause valve 262 to open to admit intake air to the combustion chamber. Note that valve spring 214 is depicted in a compressed state relative to the other valve springs shown in FIG. 2.

Figure 6:
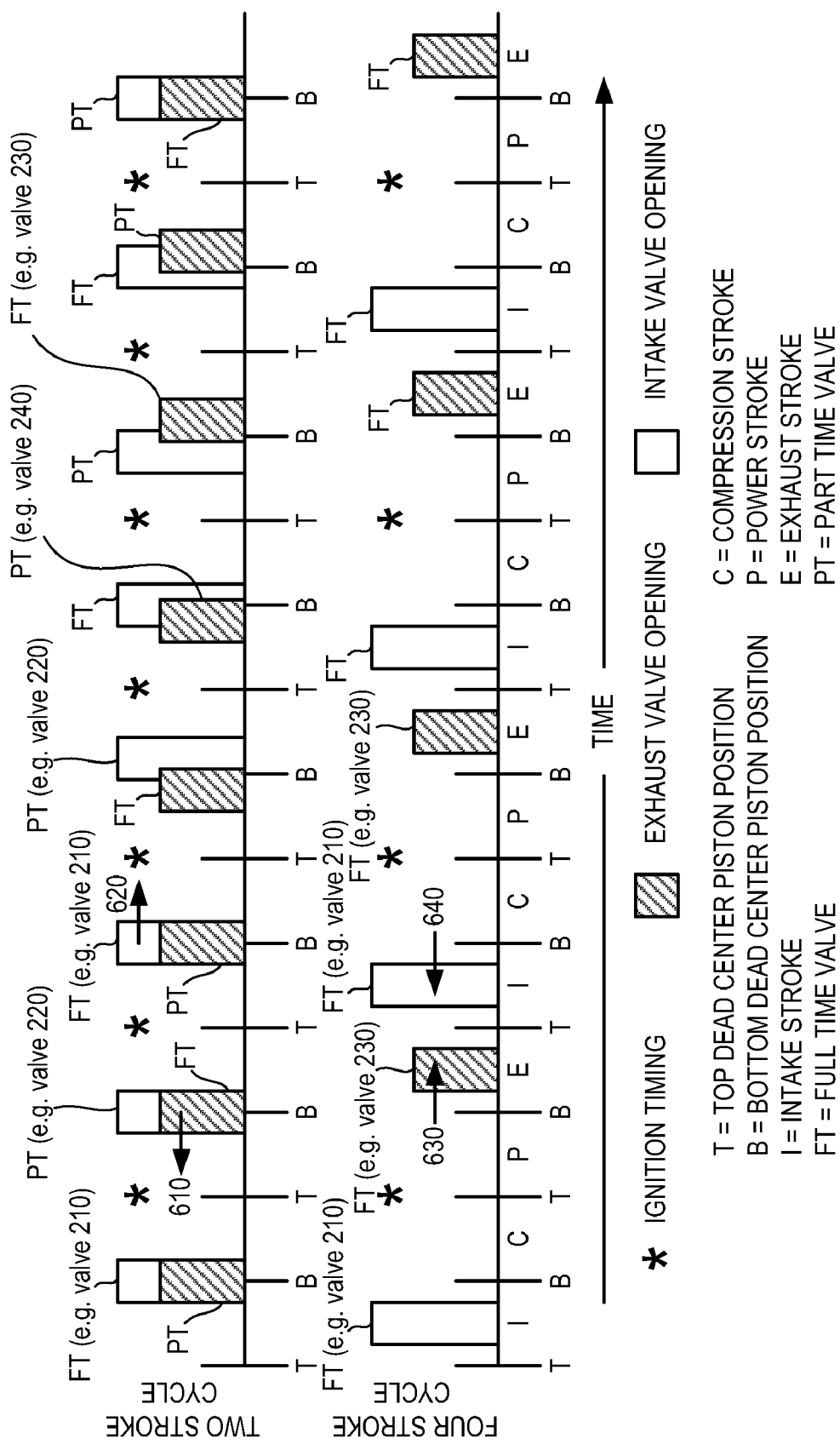
FIG. 6 illustrates an example timeline depicting operation of the internal combustion engine system.

Similarly, exhaust valve 230 may include a tappet 232 and a valve spring 234. Valve spring 234 may be configured to urge exhaust valve 230 to a closed position with respect to exhaust port 266 until opened by an actuation received from a cam actuator (e.g. cam actuator 236) via tappet 232. For example, in FIG. 2, cam actuator 236 which includes a cam lobe 237 is depicted in a position relative to tappet 232 that does not cause exhaust valve 230 to open. This position may be referred to as the base circle of the cam actuator. As further depicted in FIG. 2, cam actuator 216 may be at a different rotational position relative to tappet 212 than cam actuator 236 relative to tappet 232, thereby causing intake valve 210 and exhaust valve 230 to open at different timings relative to the crank angle of the engine. An example timing diagram is depicted in FIG. 6.

Intake valve 220 may be associated with a tappet 222, valve spring 224, and a cam actuator 226 having a cam lobe 227 that causes intake valve 220 to open. As depicted in FIG. 2, cam actuators 216 and 226 may be configured to open their respective intake valves at different timings as illustrated by their different orientations on cam shaft 252. As one example, cam actuator 216 may be orientated at approximately 180 cam angle degrees (e.g. 360 crank angle degrees) relative to cam actuator 226. Intake valve 220 may also be associated with a non-lifting cam actuator 228. The non-lifting cam actuator 228 may be the equivalent of the base circle of cam actuator 226. By varying which one of cam actuators 226 and 228 that engage tappet 222, an activated or a deactivated state of valve 220 may be selected. For example, during the activated state, cam actuator 227 may engage tappet 222, whereby valve 220 may be opened according to the lift profile of cam actuator 226 as defined by cam lobe 227. During deactivated state, valve 226 may not engage tappet 222, whereby valve 220 may remain closed (e.g. held closed by the valve spring) through an entire revolution of the cam shaft.

There are at least two ways in which intake valve 220 may be transitioned between the deactivated state and the activated state. As a first example, the crank shaft may be translated relative to tappet 222, thereby causing one of cam actuator 226 or cam actuator 228 to engage the tappet. As a non-limiting example, a variable valve timing device 270 may be configured to translate cam shaft 252 between at least two different positions, which correspond to the engagement and disengagement of cam actuator 226 from tappet 222. When cam actuator 228 engages the tappet, the valve is not lifted as a result of the non-lifting aspect of cam actuator 228. By contrast, when cam actuator 226 engages the tappet, the valve is lifted according to the profile of cam lobe 227. Where translation of the cam shaft is used to select between two or more different cam actuators, cam actuator 216 may optionally be configured with a width that enables cam actuator 216 to engage tappet 212 during each of the activated and deactivated positions of intake valve 220. In this way, intake valve 210 may continue to open according to the profile of cam actuator 216 regardless of the state of intake valve 220.

As a second example, tappet 222 may be adjusted to selectively engage cam actuator 226 during the activated state of valve 220 or disengage from cam actuator 226 during the deactivated state of valve 220. For example, tappet 222 may include lost motion functionality whereby lift provided by cam lobe 227 does not translate to valve 220 via tappet 222. Note that with each of the first and second examples, cam actuator 228 may be optionally omitted since no lift may be provided during the deactivated state of the valve. This lost motion functionality will be described in greater detail with reference to FIG. 3.

Exhaust valve 240 may be associated with a tappet 242, valve spring 244, and a cam actuator 246 having a cam lobe 247 that causes intake valve 240 to open. As depicted in FIG. 2, cam actuators 236 and 246 may be configured to open their respective exhaust valves at different timings as illustrated by their different orientations on cam shaft 256. As one example, cam actuator 236 may be orientated at approximately 180 cam angle degrees (e.g. 360 crank angle degrees) relative to cam actuator 246. Intake valve 240 may also be associated with a non-lifting cam actuator 248. The non-lifting cam actuator 248 may be the equivalent of the base circle of cam actuator 246.

By disengaging cam actuator 246 from tappet 242 and/or by varying which one of cam actuators 246 and 248 that engage tappet 242, an activated or a deactivated state of valve 240 may be selected. For example, during the activated state, cam actuator 246 may engage tappet 242, whereby valve 240 may be opened according to the lift profile of cam actuator 246 as defined by cam lobe 247. During the deactivated state, valve 246 may be disengaged from tappet 242, whereby valve 240 may remain closed (e.g. held closed by the valve spring) through an entire revolution of the cam shaft. There are at least two ways in which exhaust valve 240 may be transitioned between the deactivated state and the activated state as previously described with reference to intake valve 220. For example, a variable valve timing device 280 may be configured to translate cam shaft 256 between at least two positions, which correspond to a state where cam actuator 246 engages tappet 242 and a state where cam actuator 246 is disengaged from tappet 242. As another example, tappet 242 may provide lost motion functionality as described with reference to FIG. 3.

Note that variable valve timing devices 270 and 280 may comprise a combined unit in some embodiments. It should be appreciated that these variable valve timing devices may be actuated by any suitable approach to cause translation of the cam shafts, including hydraulic actuation or electromechanical actuation that may be initiated by controller 12. Furthermore, variable valve timing devices 270 and 280 may be configured to cause rotation of the camshafts relative to the position of the piston. In this way, the intake and exhaust valve timing may be adjusted (e.g. advanced or retarded) as will be described in greater detail with regards to FIGS. 4-6. It should be appreciated that these valve timing adjustments may be initiated by the controller via the variable valve timing devices using any suitable actuation approach, including hydraulic actuation or electromechanical actuation.

Intake valve 210 and exhaust valve 230 may be referred to as "full time" valves, since they may be operated during both four stroke and two stroke operation of combustion chamber 30, while intake valve 220 and exhaust valve 240 may be referred to as "part time" valves, since they may be operated only during the two stroke operation of combustion chamber 30, at least in some embodiments. However, as will be described with reference to FIG. 5, the full time valves and part time valves may be periodically switched in some embodiments, where the part time valves become the full time valves and vice-versa. Further still, it should be appreciated that cam shaft 252 may include a non-lifting cam actuator for valve 210 as was previously described with reference to cam actuator 228 for valve 220. Similarly, it should be appreciated that cam shaft 256 may include a non-lifting cam actuator for valve 230 as was previously described with reference to cam actuator 248 for valve 240.

Figure 3:
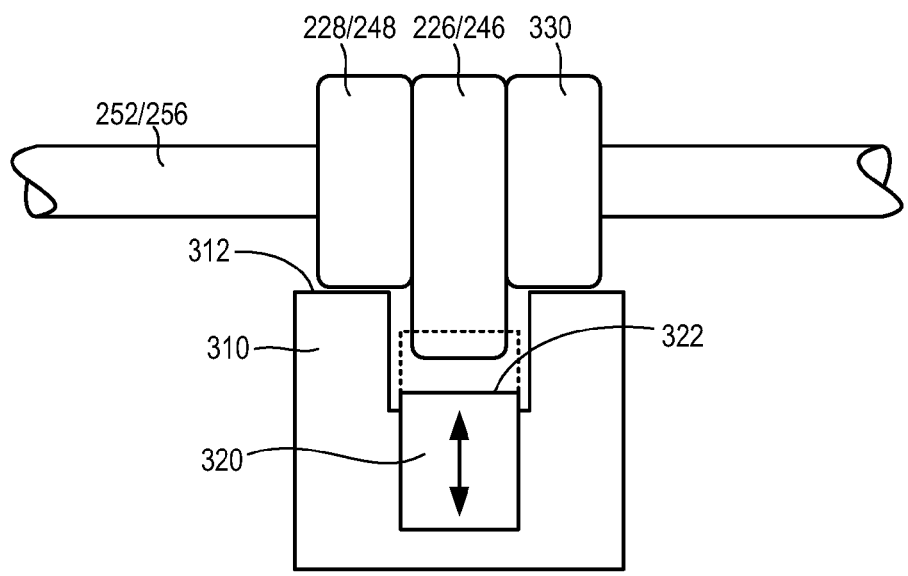
FIG. 3 illustrates an example tappet for an intake or exhaust valve.

FIG. 3 depicts a non-limiting example of a tappet 310 that exhibits lost motion functionality. It should be appreciated that other suitable tappets may be used to enable the deactivation or activation of a particular valve. Tappet 310 may refer to one of the previously described tappets. For example, where valves 210 and 230 are always operated as full time valves, tappet 310 may refer to the previously described tappets 222 and 242 of the part time valves 220 and 240. However, where valves 210 and 230 may transition between full time status and part time status as described with reference to FIG. 5, tappet 310 may refer to any of the previously described tappets.

FIG. 3 illustrates a cam shaft which may include one of the previously described cam shafts 252/256 and its associated cams 228/248 and 226/246. In this particular embodiment, tappet 310 has an actuation member 320 which may be translated relative to the tappet to engage or disengage the lifting cam actuator (e.g. cam actuator 226 or 246). Tappet 310 may include a contact surface 312 that interfaces with a non-lifting cam (e.g. 228/248) when the valve is set to the deactivated state. When the valve is to be set to the activated state, actuation member 320 may be translated toward the lifting cam so that surface 322 contacts the lifting cam causing the valve to open according to the profile of the lifting cam. Note that in some embodiments, a second non-lifting cam 330 may be provided to balance the forces applied to surface 312 of the tappet. In other embodiments, such as where the lifting cam is arranged on the outside of the tappet and the non-lifting cam is arranged on the inside of the tappet, a second lifting cam may be provided to balance the forces applied to the surface of the tappet. Note that FIG. 3 provides merely one non-limiting example of how activation and deactivation of a valve may be performed by a tappet having lost motion functionality.

Figure 4:
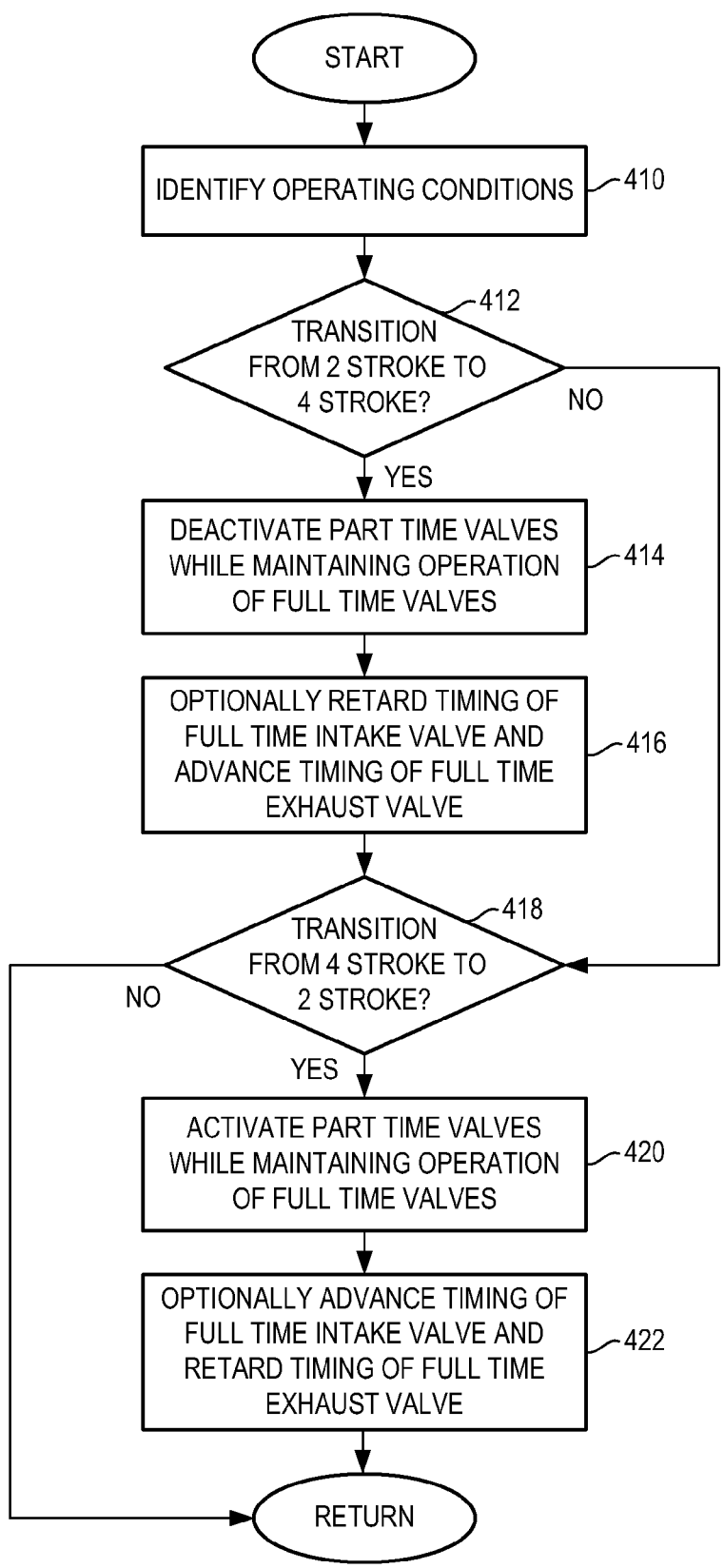
FIGS. 4 and 5 illustrate example process flows for controlling the internal combustion engine system.
Figure 5:
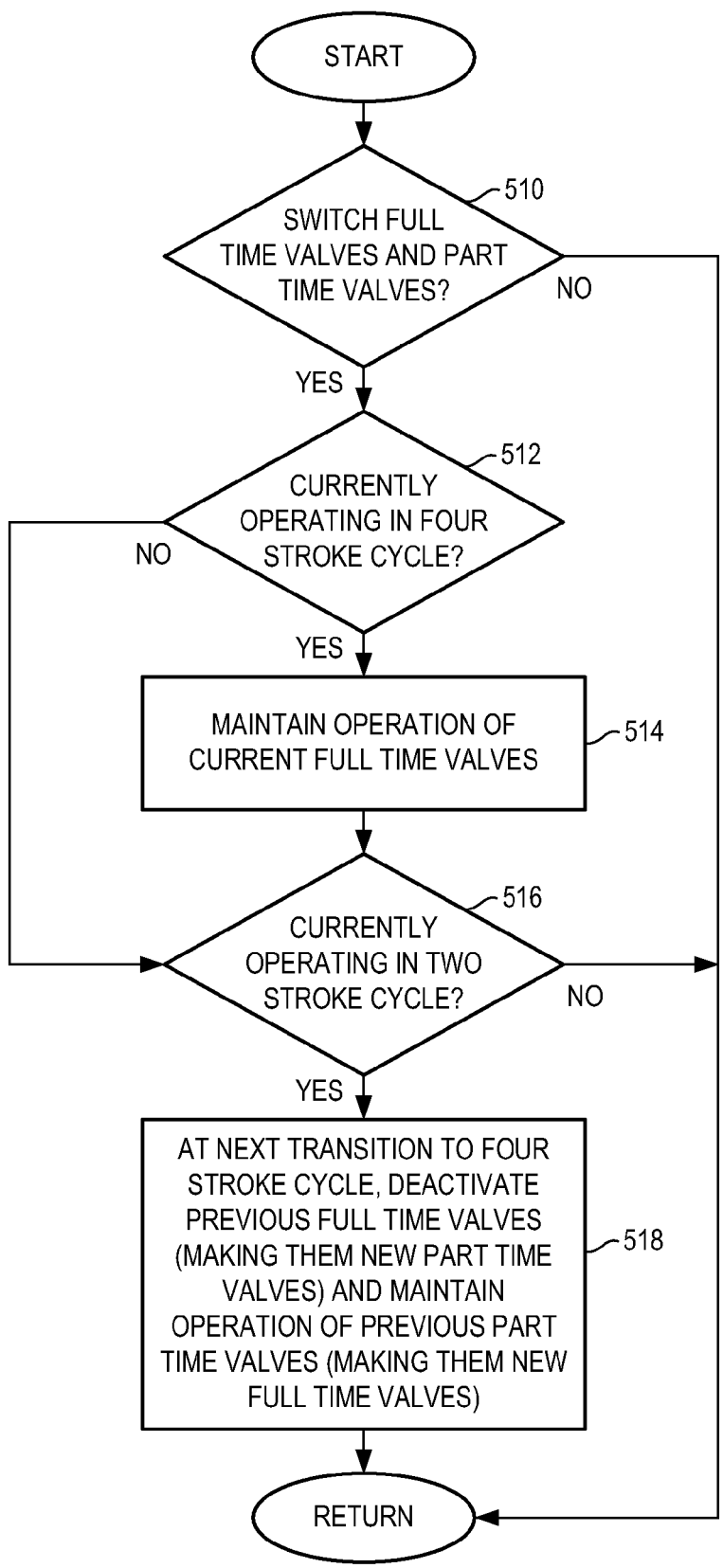

FIGS. 4 and 5 depict example process flows that may be used to control valve system 200. These process flows may represent instructions residing on computer readable media that may be performed by a processing subsystem of the control system. Referring to FIG. 4, at 410, operating conditions of the engine system may be identified. For example, the control system may receive feedback from the various sensors that were previously described with reference to FIG. 1. These operating conditions may include, but are not limited to: current engine speed, current engine load, current engine torque, an operator requested output (e.g. as indicated by pedal position) such as desired engine torque or desired engine speed to be produced by the engine, boost pressure, ambient conditions, etc.

At 412, if one or more combustion chambers of the engine system are to be transitioned from the two stroke cycle to the four stroke cycle, the process flow may proceed to 414. For example, the control system may judge that a transition is to be performed from the two stroke cycle to the four stroke cycle responsive to the operating conditions identified at 410. As a non-limiting example, the control system may transition the engine to the four stroke cycle at higher engine speeds or when a lower engine output torque is requested by the vehicle operator.

At 414, the part time valves (e.g. valves 220 and 240) may be deactivated (i.e. set to the deactivate state) while operation of the full time valves (e.g. valves 210 and 230) is maintained. For example, referring also to FIG. 6, the full time (FT) valves may continue to operate in the active state while the part time (PT) valves may be deactivated at the closed valve state (e.g. as assisted by the valve springs).

Optionally, at 416, the timing of the full time intake valve (e.g. valve 210) may be retarded and the timing of the full time exhaust valve (e.g. valve 220) may be advanced responsive to the transition from the two stroke cycle to the four stroke cycle. For example, referring also to FIG. 6, the full time (FT) exhaust valve timing may be retarded to a later timing during the four stroke cycle as indicated at 630 relative to its timing during the two stroke cycle, and the full time (FT) intake valve timing may be advanced to an earlier timing during the four stroke cycle as indicated at 640 relative to its timing during the two stroke cycle.

From 416 or if the answer at 412 is judge no, the process flow may proceed to 418. If a transition from the four stroke cycle to the two stroke cycle is to be performed, the process flow may proceed to 420. For example, the control system may judge whether the transition from four stroke operation to two stroke operation is to be performed responsive to the operating conditions identified at 410. As a non-limiting example, the control system may transition the engine to the two stroke cycle at lower engine speeds or when a higher engine output torque is requested by the vehicle operator. It should be appreciated that the valve control approaches described herein are not limited to this particular example.

At 420, the part time valves may be activated to transition to two stroke operation while maintaining operation of the full time valves (e.g. valves 210 and 230). During two stroke operation, the spark and fuel may be provided to the combustion chambers approximately every 360 crank angle degrees as depicted in FIG. 6. By contrast, during four stroke operation, the spark and fuel may be provided to the combustion chambers approximately every 720 crank angle degrees as also shown in FIG. 6.

Optionally, at 422, the timing of the full time intake valve (e.g. valve 210) may be advanced and the timing of the full time exhaust valve (e.g. valve 220) may be retarded responsive to the transition from four stroke operation to two stroke operation. For example, referring also to FIG. 6, the full time (FT) exhaust valve timing may be advanced to an earlier timing during the two stroke cycle as indicated at 610 relative to its timing during the four stroke cycle, and the full time (FT) intake valve timing may be retarded to a later timing during the two stroke cycle as indicated at 620 relative to its timing during the four stroke cycle. FIG. 6 illustrates how the part time (PT) intake valve (e.g. valve 220) and part time (PT) exhaust valve (e.g. valve 240) may be operated during the two stroke cycle. FIG. 6 also depicts how the relative timing of the intake and exhaust valves (i.e. the valve overlap) may be adjusted during the two stroke cycle responsive to operating conditions identified at 410. For example, the overlap between a full time valve and a part time valve may be adjusted according to boost pressure, engine speed, engine load, engine torque output, operator requested engine torque, etc. From 422 or if the answer is no at 418, the process flow may return to the start.

Referring to FIG. 5, at 510, it may be judged whether a valve's status as a "full time" valve should be switched to a part time operation. As one example, the control system may periodically operate full time valves as part time valves and part time valves as full time valves in order to reduce asymmetry in valve wear among the various valves of the engine. As a non-limiting example, the control system may record the number of opening events provided by each valve or the amount of time each valve has been activated, whereby the control system may assign "full time" and "part time" status to the valves in a manner that more closely balances the number of opening events or activation time of the various valves. If the answer at 510 is yes, the process flow may proceed to 512. Alternatively, if the answer at 510 is no, the process flow may return to the start.

At 512, it may be judged whether the engine system or a particular combustion chamber of the engine system is currently operating in the four stroke cycle. If the answer at 512 is judged yes, the process flow may proceed to 514, where operation of the current full time valves may be maintained in the active full time state at 514. Alternatively, if the answer at 512 is judged no, the process flow may proceed to 516.

At 516, it may be judged whether the engine system or a particular cycle of the engine system is currently operating in the two stroke cycle. If the answer at 516 is judged yes, the process flow may proceed to 518. Alternatively, if the answer at 516 is judged no, the process flow may return to the start. At 518, during the next transition of the engine system or combustion chamber from the two stroke cycle to the four stroke cycle, the control system may deactivate the previous full time valves (rather than the previous part time valves) while maintaining operation of the previous part time valves. In this way, the part time valves may obtain the status of full time valves while the previous full time valves are deactivated in accordance with their new status as part time valves. Note that the valve timings of the previous part time valves (i.e. new full time valves) may be adjusted responsive to the transition as described with reference to FIG. 4. In this way, valve system wear may be balanced more evenly among the various valves of the engine system.

FIG. 6 illustrates how the cam actuator arrangement of FIG. 2 may cause a full time intake valve to repeatedly open once every four strokes during the four stroke cycle and a full time exhaust valve to repeatedly open once every four strokes during the four stroke cycle. During the two stroke cycle, the full time valves may continue to operate at the same frequency relative to piston position (although valve timing adjustments may be performed responsive to the transition as indicated at 610, 620, 630, and 640), while the part time intake valve is repeatedly opened once every 4 strokes during a different intake stroke than the full time intake valve, and the part time exhaust valve is repeatedly opened once every 4 strokes by a during a different exhaust stroke than the full time exhaust valve. For example, during two stroke operation, the full time intake valve and the part time intake valve may be opened approximately 360 crank angle degrees apart and the full time exhaust valve and the part time exhaust vale may be opened approximately 360 crank angle degrees apart (excluding the transient valve timing adjustments that may be performed in response to changes in operating conditions as demonstrated by the latter half of the two stroke cycle shown in FIG. 6).

Note that the example control and estimation routines that are depicted by the above process flows can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and subcombinations of the various systems and configurations, and other features, functions, and/or properties disclosed herein.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an internal combustion engine including at least one combustion chamber having a piston disposed therein, the method comprising:
   repeatedly opening a first intake valve of the combustion chamber once every four piston strokes and repeatedly opening a first exhaust valve of the combustion chamber once every four piston strokes during a different stroke than the first intake valve;
   transitioning operation of the combustion chamber from a four stroke cycle to a two stroke cycle by:
      activating a second intake valve of the combustion chamber to repeatedly open once every four piston strokes during a different intake stroke than the first intake valve;
      activating a second exhaust valve of the combustion chamber to repeatedly open once every four piston strokes during a different exhaust stroke than the first exhaust valve;
      advancing an opening timing of the first intake valve; and
      retarding an opening timing of the first exhaust valve.

2. The method of claim 1, further comprising:
   transitioning operation of the combustion chamber from the two stroke cycle to the four stroke cycle by:
      deactivating each of the second intake valve and the second exhaust valve in a closed position;
      retarding the opening timing of the first intake valve; and
      advancing the opening timing of the first exhaust valve.

3. The method of claim 2, where said transitioning operation of the combustion chamber from the two stroke cycle to the four stroke cycle is performed responsive to a change in an operating condition of the engine.

4. The method of 3, where the operating condition includes one or more of engine speed, engine load, engine output torque, and an operator requested engine output torque.

5. The method of claim 1, where advancing the opening timing of the first intake valve includes varying a rotational position of a cam shaft relative to a rotational position of a crankshaft of the engine operatively coupled with the piston, where the first intake valve is opened via a cam actuator mounted on the cam shaft.

6. A method of operating an internal combustion engine including at least one combustion chamber having a piston disposed therein, the method comprising:
 operating the combustion chamber in a four stroke cycle by repeatedly opening a first exhaust valve of the combustion chamber once every four piston strokes via a first cam actuator while holding closed a second exhaust valve of the combustion chamber;
 after operating the combustion chamber in the four stroke cycle, operating the combustion chamber in a two stroke cycle by repeatedly opening the first exhaust valve once every four piston strokes via the first cam actuator and repeatedly opening the second exhaust valve once every four piston strokes via a second cam actuator during a different exhaust stroke than the first exhaust valve; and
 after operating the combustion chamber in the two stroke cycle, operating the combustion chamber in the four stroke cycle by repeatedly opening the second exhaust valve of the combustion chamber once every four piston strokes via the second cam actuator while holding closed the first exhaust valve of the combustion chamber.

7. The method of claim 6, further comprising, varying operation of the combustion chamber between the four stroke cycle and the two stroke cycle as an operating condition changes.

8. The method of claim 7, where the operating condition includes one or more of engine load, engine speed, or engine torque.

9. The method of claim 6, further comprising, transitioning the combustion chamber from the four stroke cycle to the two stroke cycle by retarding an opening timing of the first exhaust valve while activating the second exhaust valve to repeatedly open once every four piston strokes during the different exhaust stroke than the first exhaust valve.

10. The method of claim 9, further comprising, transitioning the combustion chamber from the two stroke cycle to the four stroke cycle by advancing the opening timing of the second exhaust valve while deactivating the second exhaust valve in a closed position.

11. An internal combustion engine system for a vehicle, comprising:
 an engine body defining at least one combustion chamber having a piston disposed therein;
 a manifold coupled to the engine body and defining a fluid passage that communicates with the combustion chamber via a first valve and a second valve;
 a first cam actuator configured to open the first valve;
 a second cam actuator configured to open the second valve; and
 a control system configured to:
  operate the first cam actuator to repeatedly open the first valve once every four piston strokes and operate the second cam actuator to repeatedly open the second valve once every four piston strokes during a different stroke than the first valve to carry out combustion in the combustion chamber according to a two stroke cycle; and
  transition the combustion chamber from the two stroke cycle to a four stroke cycle by deactivating the second valve while adjusting an opening timing of the first valve.

12. The engine system of claim 11, where the manifold is an intake manifold, the first valve is a first intake valve, and the second valve is a second intake valve; and
 where the control system is further configured to adjust the opening timing of the first valve by retarding the opening timing of the first valve while transitioning the combustion chamber from the two stroke cycle to the four stroke cycle.

13. The engine system of claim 11, where the manifold is an exhaust manifold, the first valve is a first exhaust valve, and the second valve is a second exhaust valve; and
 where the control system is further configured to adjust the opening timing of the first valve by advancing the opening timing of the first valve while transitioning the combustion chamber from the two stroke cycle to the four stroke cycle.

14. The engine system of claim 11, where the control system is further configured to:
 operate the first cam actuator to repeatedly open the first valve once every four piston strokes while holding the second valve closed to carry out combustion in the combustion chamber according to the four stroke cycle.

15. The engine system of claim 11, further comprising a tappet arranged between the second valve and the second cam actuator and a valve spring configured to urge the second valve to a closed state when not opened by the second cam actuator, where the tappet includes a lifting state that transmits an actuation from the second cam actuator to the second valve during the two stroke cycle so that the second valve is repeatedly opened, and a non-lifting state that inhibits transmission of the actuation from the second cam actuator to the second valve during the four stroke cycle so that the second valve is held closed by the valve spring; and where the control system is further configured to deactivate the second valve by setting the tappet to the non-lifting state.

16. The engine system of claim 15, where the control system is further configured to:
 transition the combustion chamber from the four stroke cycle to the two stroke cycle by activating the second valve while adjusting the opening timing of the first valve.

17. The engine system of claim 16, where the manifold is an intake manifold, the first valve is a first intake valve, and the second valve is a second intake valve; and
 where the control system is further configured to adjust the opening timing of the first valve by advancing the opening timing of the first valve while transitioning the combustion chamber from the four stroke cycle to the two stroke cycle.

18. The engine system of claim 16, where the manifold is an exhaust manifold, the first valve is a first exhaust valve, and the second valve is a second exhaust valve; and
 where the control system is further configured to adjust the opening timing of the first valve by retarding the opening timing of the first valve while transitioning the combustion chamber from the four stroke cycle to the two stroke cycle.

19. The engine system of claim 11, where the control system is further configured to:
 perform a first transition of the combustion chamber from the two stroke cycle to the four stroke cycle by holding the second valve closed while adjusting an opening timing of the first valve; and perform a second transition of the combustion chamber from the two stroke cycle to the four stroke cycle after the first transition by holding the first valve closed while adjusting an opening timing of the second valve.

20. The engine system of claim 11, further comprising a variable valve timing device configured to adjust a rotational position of the first cam actuator relative to the piston's position; and where the control system is configured to adjust the opening timing of the first valve via the variable valve timing device.

* * * * *